(12) United States Patent
Matuska et al.

(10) Patent No.: US 7,598,888 B2
(45) Date of Patent: Oct. 6, 2009

(54) ROTARY WING AIRCRAFT PROXIMITY WARNING SYSTEM WITH A GEOGRAPHICALLY BASED AVOIDANCE SYSTEM

(75) Inventors: David G. Matuska, Huntington, CT (US); Donald S. Anttila, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 439 days.

(21) Appl. No.: 11/608,267

(22) Filed: Dec. 8, 2006

(65) Prior Publication Data

US 2008/0140267 A1 Jun. 12, 2008

(51) Int. Cl.
G08B 21/00 (2006.01)
G01S 13/00 (2006.01)
G08G 5/04 (2006.01)

(52) U.S. Cl. ............... 340/945; 340/946; 340/961; 340/963; 340/970; 342/29; 342/30; 342/36; 701/3; 701/9; 701/14; 701/301

(58) Field of Classification Search ............... 340/901, 340/903, 945, 946, 961, 963, 970; 342/29–32; 701/3, 9, 14, 301
See application file for complete search history.

(56) References Cited

U.S. PATENT DOCUMENTS

| | | | | |
|---|---|---|---|---|
| 6,014,090 | A * | 1/2000 | Rosen et al. | 340/905 |
| 6,043,759 | A | 3/2000 | Paterson | |
| 6,483,453 | B2 * | 11/2002 | Oey et al. | 342/29 |
| 6,643,517 | B1 * | 11/2003 | Steer | 455/456.4 |
| 6,744,396 | B2 * | 6/2004 | Stone et al. | 342/36 |
| 6,832,093 | B1 * | 12/2004 | Ranta | 455/456.4 |
| 6,879,886 | B2 * | 4/2005 | Wilkins et al. | 701/3 |
| 6,906,641 | B2 * | 6/2005 | Ishihara | 340/946 |
| 6,911,936 | B2 * | 6/2005 | Stayton et al. | 342/182 |
| 7,053,797 | B2 * | 5/2006 | Taylor | 340/961 |
| 7,127,334 | B2 * | 10/2006 | Frink | 701/3 |

(Continued)

FOREIGN PATENT DOCUMENTS

DE 3501954 7/1986

(Continued)

OTHER PUBLICATIONS

PCT International Search Report and Written Opinion mailed Feb. 13, 2009, PCT/US2007/086331.

*Primary Examiner*—Davetta W Goins
*Assistant Examiner*—Anne V Lai
(74) *Attorney, Agent, or Firm*—Carlson Gaskey & Olds PC

(57) ABSTRACT

A safety enhancement warning system includes an avoidance system which communicates with a multiple of geographical positional systems. A geographic algorithm of the avoidance system utilizes a recursive algorithmic to determine if the aircraft will enter a sensitive area. If the aircraft distance to a sensitive area decreases below a predefined minimum threshold, then an audible and/or visual warning is issued. For certain sensitive areas, aircraft RF emissions are silenced or reduced in power when the predetermined minimum threshold breaches the sensitive area. The use of the avoidance system enables usage of relatively inexpensive UWB radar for the proximity sensor suite to assure avoidance of interference with particular delicate instruments and thereby meet regulations such as those propagated by the FCC.

34 Claims, 11 Drawing Sheets

U.S. PATENT DOCUMENTS

| | | | |
|---|---|---|---|
| 7,379,795 B2 * | 5/2008 | Arnouse | 701/3 |
| 2002/0030607 A1 | 3/2002 | Conner | |
| 2003/0055540 A1 * | 3/2003 | Hansen | 701/3 |
| 2005/0113985 A1 * | 5/2005 | Greene | 701/9 |
| 2006/0109107 A1 | 5/2006 | Staton | |

FOREIGN PATENT DOCUMENTS

| | | |
|---|---|---|
| EP | 1726973 A | 11/2006 |
| GB | 2408492 A | 6/2005 |
| WO | 02/21229 A | 3/2002 |
| WO | 2006/083408 A | 8/2006 |
| WO | 2007/024635 A | 3/2007 |

\* cited by examiner

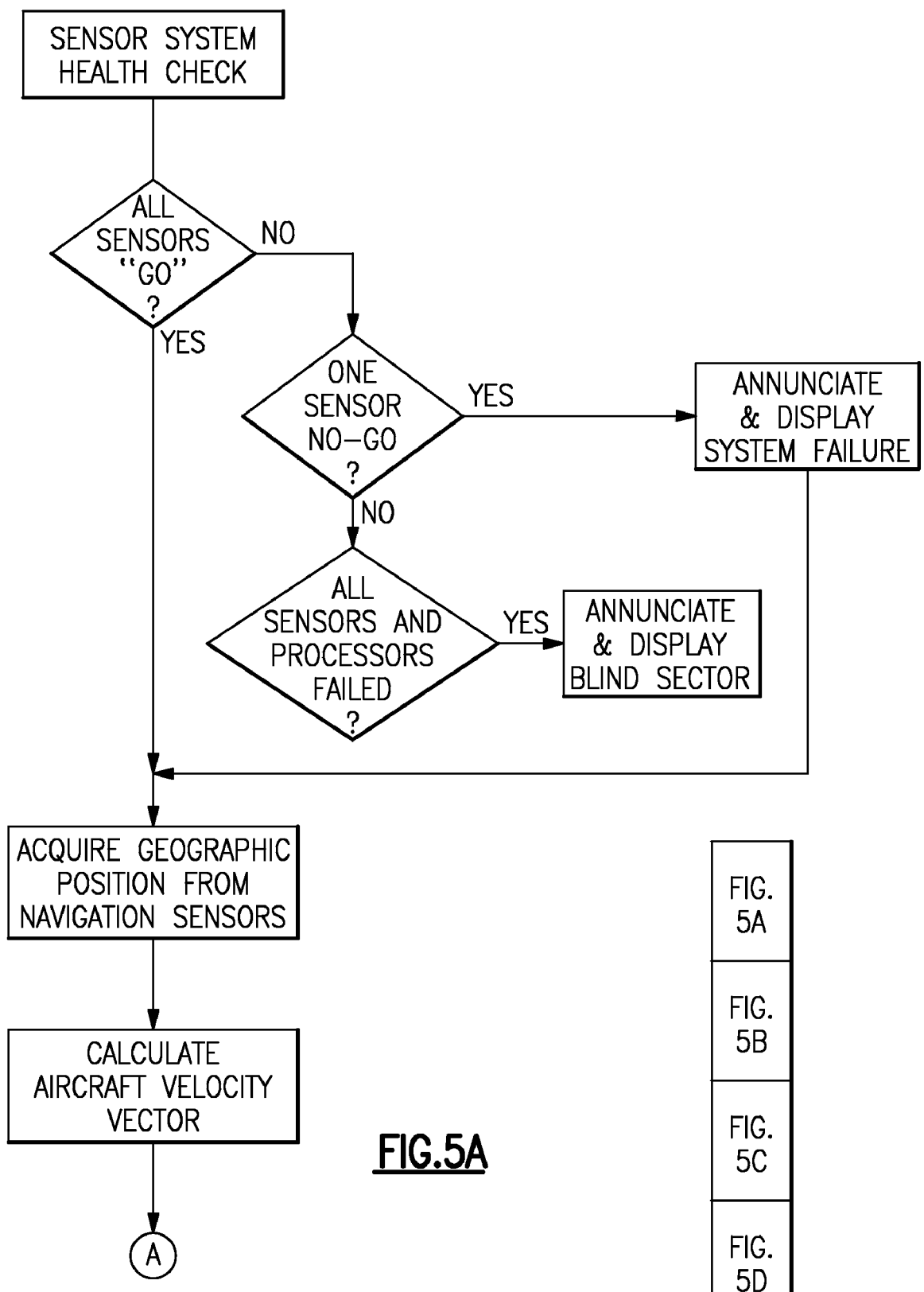

ROTARY WING AIRCRAFT PROXIMITY WARNING SYSTEM WITH A GEOGRAPHICALLY BASED AVOIDANCE SYSTEM

BACKGROUND OF THE INVENTION

The present invention relates to an avoidance system, and more particularly to an avoidance system which includes a geographical database to avoid interference with known sensitive ground based instruments and thereby accommodating particular regulations or other restrictions.

Various systems have been developed to minimize the likelihood that a rotary wing aircraft will contact obstacles, such as telephone lines, etc., while flying at low levels. Current techniques include active electronic systems such as microwave and millimeter wave radar systems, passive systems which detect the magnetic flux from a live transmission line, and mechanical systems which cut the wires upon contact.

Disadvantageously, these ground obstacles alert systems may interfere with sensitive ground based instruments such as radio-telescopes. Ground obstacles alert systems are thereby subject to regulations such as those propagated by various government agencies such as the FCC. Specialized emitters which operate on particular frequencies which avoid interference are thereby utilized with aircraft ground obstacle alert systems. Although effective, ground obstacles alert systems with specialized emitters are relatively expensive which may limit common introduction of these systems into aircraft. Additionally, aircraft often are required to avoid other types of areas such as, but not exhaustively including, sports arenas, sensitive areas near power plants, hospitals, sensitive Government facilities, retirement developments, etcetera whether or not these facilities emit radio frequencies.

Accordingly, it is desirable to provide an inexpensive avoidance system which avoids interference with sensitive ground-based instruments and geographic areas.

SUMMARY OF THE INVENTION

The proximity warning system according to the present invention includes an avoidance system which communicates with a multiple of geographical positional systems. The avoidance system includes a geographic algorithm and a sensitive area geographic database. The geographic algorithm of the avoidance system utilizes a recursive algorithm to determine if the aircraft is approaching or has entered a sensitive area.

In operation, the geographic position of the aircraft is established and continually updated based on data from the geographic positional systems. The aircraft position is continually compared against the sensitive area geographic database of known "sensitive areas." Sensitive areas may include restricted airspace such as military installations, national monuments, NASA installations, as well as others. Furthermore, the sensitive area geographic database may be time and date specific such that some areas may only be "sensitive areas" when particular events such as large sporting events or VIPs are so situated.

If the aircraft is determined to be within a coarse range of a sensitive area stored within the sensitive area geographic database, then the avoidance system will increase the analytical scrutiny of the relative distance and time to the sensitive area(s) using a fine resolution analysis of the distance and time to the sensitive areas. Coarse range calculations of relative positions may be based on GPS sensed proximity. Increased scrutiny during the fine resolution step includes the continual calculation of spherical range and closure rate for each sensitive area within the defined coarse range for the aircraft state. This fine resolution analysis may be two-dimensional or three dimensional as indicated by the nature of the site(s) to be avoided.

If the aircraft distance and/or "time to conflict" to a sensitive area decreases below a predefined minimum threshold, then an audible and/or visual warning is issued. "Avoid" parameters within the sensitive area geographic database may display a suggested flight path to avoid the sensitive area. For certain sensitive areas, aircraft RF emissions from, for example, a proximity sensor suite are also silenced or reduced in power. RF silence or reduced emissions will be maintained until the aircraft distance to the sensitive area exceeds the minimum distance threshold. Such emission control can be either a binary "On/Off" or may be a linear control of the aircraft emissions that are calculated as a function if distance from the RF-sensitive site(s).

The avoidance system enables usage of relatively inexpensive Ultra Wide Band (UWB) radar for the aircraft proximity sensor suite rather than specialized emitters in order to assure avoidance of interference with particular delicate instruments such as radio-telescopes and thereby meet regulations such as those propagated by the FCC. The use of Ultra Wideband Radar is one example of the type of sensor that can be used, it should be noted however that other radar sensors, which are not Ultra Wideband, can also be used as the RF source.

The present invention therefore provides an inexpensive UWB avoidance system which precludes interference with delicate ground based instruments.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
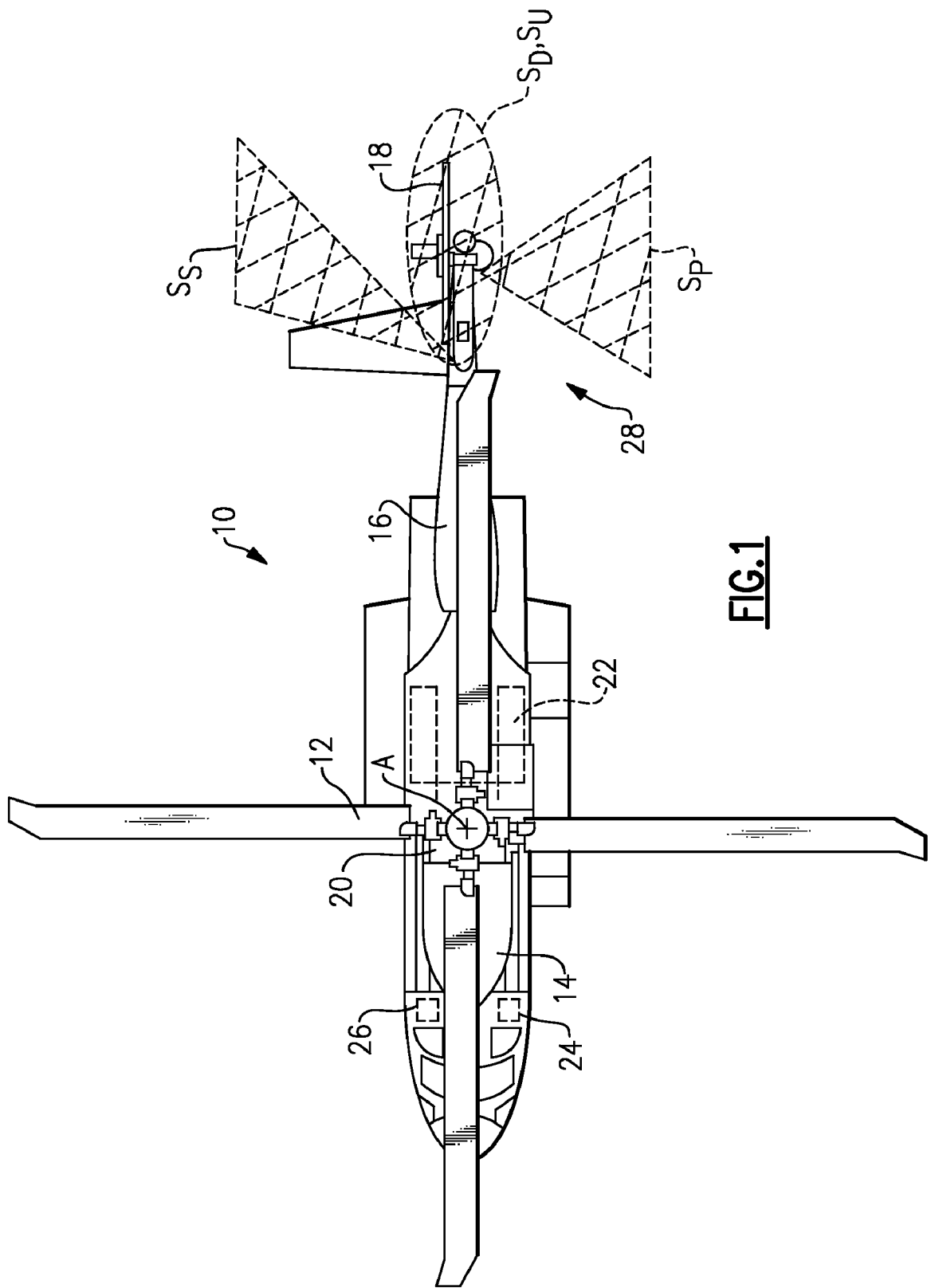
FIG. 1 is a general top view of an exemplary rotary wing aircraft embodiment for use with the present invention.

As schematically illustrated in FIG. 1, a rotary-wing aircraft 10 generally includes a fuselage 14, a main rotor system 12 and an extending tail 16 which may include a tail rotor system such as an anti-torque tail rotor 18, a rotor propulsion system or the like. The main rotor system 12 is driven about an axis of rotor rotation A through a transmission (illustrated schematically at 20) by one or more engines 22. Although a particular helicopter configuration is illustrated and described in the disclosed embodiment, other configurations and/or machines, such as jet aircraft, turbo-props, tilt-rotor and tilt-wing aircraft, will also benefit from the present invention.

The aircraft 10 includes an aircraft flight control system 26 having an avoidance system 24 integrated therewith. The avoidance system 24 preferably includes a proximity sensor suite 28 which may, for example only, be located within the extending tail 16 but may alternatively or additionally be located anywhere on the aircraft 10. As such, the proximity sensor suite 28 provides a field of view about the extending tail 16 adjacent the tail rotor system 18, preferably along a path along which the tail rotor 18 may travel. It should be understood that other sensor mounting locations may also be utilized with the present invention to permit detection adjacent other aircraft systems such as the main rotor system 12, landing gear, etc. For example, the sensor suites 28 may be located on or adjacent to the fuselage 14 in order to detect nearby obstacles to the main rotor system 12.

The proximity sensor suite 28 preferably includes one or more sensor types, and one or more sensor locations to provide a significant field of view while minimizing false detection. As illustrated, the field of view may be a conical, trapezoidal, beam, line, etc. field of view extending from the fuselage 14 and/or the tail 16. For example, the field of view may extend from the bottom, the top, the front, the back and the sides of the aircraft 10 on a path along which the aircraft may travel. As illustrated, the sensor suite 28 may include a port directed sensor field of view Sp, a starboard directed sensor field of view Ss, a downward directed field of view Sd, a rearward directed field of view Sr, an upward directed field of view Su, or any combinations thereof. It should be understood that the fields of view are depicted schematically and that various emission patterns may be used with the present invention.

Furthermore, the fields of view may be selectively activated in response to predefined conditions such as airspeed, altitude, and such like so that the sensor suite 28 selectively minimizes emissions. That is, other aircraft flight conditions may be utilized to limit operation of the avoidance system 24. For example, once the aircraft 10 has reached a particular altitude, such as over 100 feet in altitude, the proximity sensor suite 28 may be shut-down as tail-rotor strikes are unlikely at this altitude and above. It should be understood that various flight conditions may alternatively or additionally be programmed into the avoidance system 24 to selectively silence or reduce the transmission power of the proximity sensor suite 28 in response to various situations.

Figure 2A:
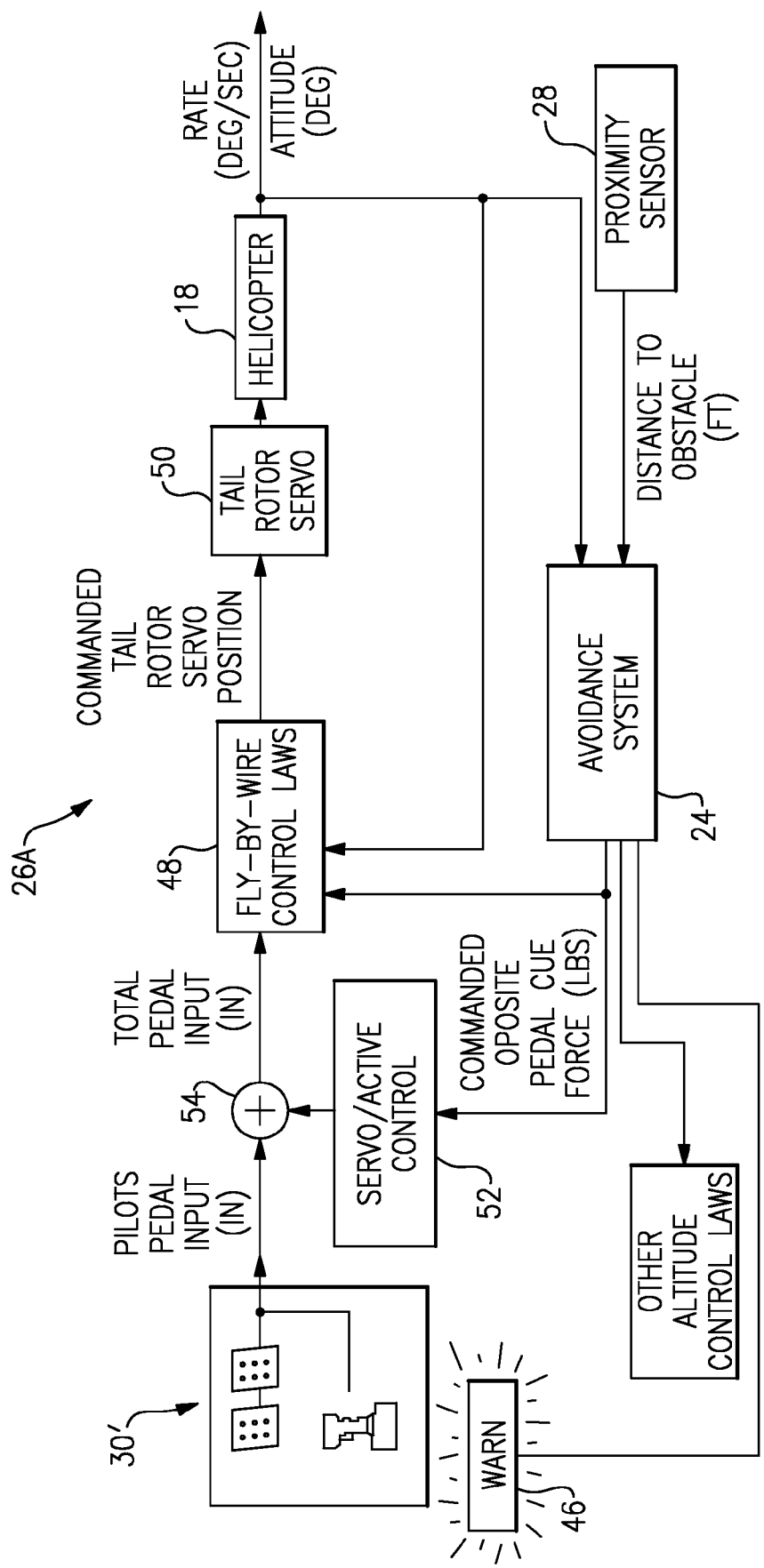
FIG. 2A is a block diagram of a full authority flight control system with an avoidance system of the present invention.
Figure 2B:
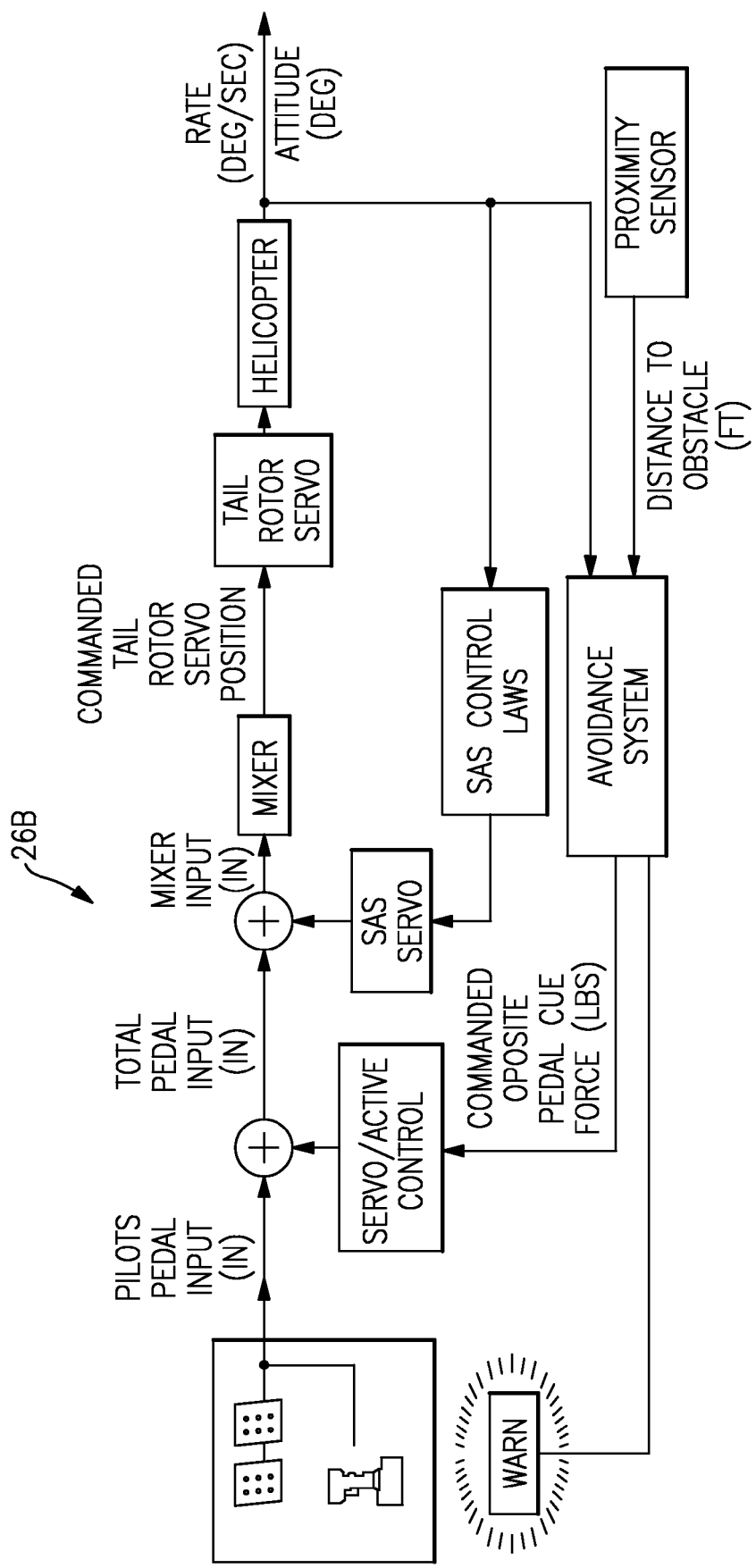
FIG. 2B is a block diagram of a partial authority flight control system with an avoidance system of the present invention.

The proximity sensor suite 28 may include (but is not limited to) sensors, which operate through infrared, laser radar, microwave technology, millimeter radar, echolocation detection, and combinations thereof. Microwave technology preferably combines both doppler processing and pulse waveforms to detect obstacles. Sector scan coverage provides estimates of the sector in which the intrusion is occurring, and may be incorporated with other complementary sensors, such as echolocation. In one preferred embodiment, the proximity sensor suite 28 includes an UWB radar typical of that utilized the automotive industry such as a 24 $GH_2$ radar system Referring to FIG. 2A, the aircraft flight control system 26A may include a full authority Fly-By-Wire (FBW) control system 26A that utilizes signals to convey pilot intentions directly to the flight control servos. Alternatively, the aircraft flight control system may be a partial authority flight control system 26B (FIG. 2B) which generally includes a full authority mechanical connection from the pilot control inceptor to the aircraft flight controls and a partial authority (typically, for example, 10%) Stability Augmentation System (SAS) servomechanism. For further understanding of other aspects of an aircraft flight control system having an avoidance system integrated therewith and associated systems thereof, attention is directed to U.S. patent application Ser. No. 11/213,110, entitled ROTARY WING AIRCRAFT FLIGHT CONTROL SYSTEM WITH A PROXIMITY CUEING AND AVOIDANCE SYSTEM, which is assigned to the assignee of the instant invention and which is hereby incorporated herein in its entirety.

In the FBW control system 26A, a pilot may provide the aircraft 10, for example only, the tail rotor 18, input through an input control device 30, such as a pedal, a control stick, etc. The pilot's input is communicated to a FBW control law logic 48 to directly drive, for example only, a tail rotor drive servo 50. The tail rotor drive servo 50 controls the pitch of the tail rotor 18 to move the aircraft 10 at a commanded rate.

The FBW control law logic 48 receives aircraft rate and attitude response feedback directly so as to modify the pilot's input to actively control the aircraft's response. As generally understood, FBW systems may provide such feedback mechanisms utilizing linear control system logic, such as proportional, integral, or derivative (PID) paths to achieve a desired response and to compensate for undesired destabilization forces acting on the aircraft in the particular axis. It should be understood that FBW control law logic theory may be incorporated through a multiple of flight control systems.

The aircraft rate and attitude response feedback is also fed directly to the avoidance system 24. The avoidance system 24 receives the proximity signal from the proximity sensor suite 28. If the avoidance system 24 determines that the aircraft 10, for example only, the tail rotor 18, is at risk of contacting a detected obstacle, the avoidance system 24 produces a command signal which is communicated to a servo 52 as well as to the FBW control law logic 48. That is, the command signal produced by the avoidance system 24 is incorporated as feedback into the FBW control law logic 48.

If the avoidance system 24 determines that the aircraft 10 is at risk for contacting the obstacle, the avoidance system 24 produces a command signal through the servo 52, which may be opposite of the pilot's signal. Thereafter, the servo 52 produces a force in the input control device 30 opposite to the pilot's input by summing the servo 52 with the pilot's input through an adder 54. The servo 52 generates an opposite input to essentially stiffen the input control device 30 to provide force feedback to the pilot in a direction which will move the aircraft, for example only, the tail rotor 18, away from the detected obstacle to minimize the likelihood of obstacle contact.

In addition, as the FBW control system 26A provides full authority through control laws, the avoidance system 24 will appropriately limit or "shape" the pilot control input provided to, for example, the tail rotor drive servo 50 so as to as to avoid the proximate obstacle. That is, the FBW control system 26 provides feedback forces to the pilot as well as shapes the commanded tail rotor position to prevent the pilot's input, which may otherwise drive the aircraft 10 into the detected obstacle.

The FBW control system 26 may additionally be integrated with other control laws, for example only, to increase the aircraft altitude in response to a pilot's command input which is not alleviated in response to force feedback from the avoidance system 24. For example, the avoidance system 24 would communicate with an altitude FBW control law logic within a primary flight control computer to increase aircraft altitude to clear the detected obstacle such that a pilot's command input can then be effectuated such that the aircraft 10 is essentially moved over the detected obstacle.

It should be understood that the avoidance system 24 described above can alternatively produce a command signal which is in communication with any control servo, such as, for example, a cyclic servo, a collective servo, etc. to generate an input to provide feedback to the pilot in a direction which would tend to preclude the aircraft from moving closer to the detected obstacle. This includes tactile feedback control signal to the pilot to communicate impending danger of continuing aircraft motion in a manner which allows the aircraft to move closer to the detected obstacle.

Figure 2C:
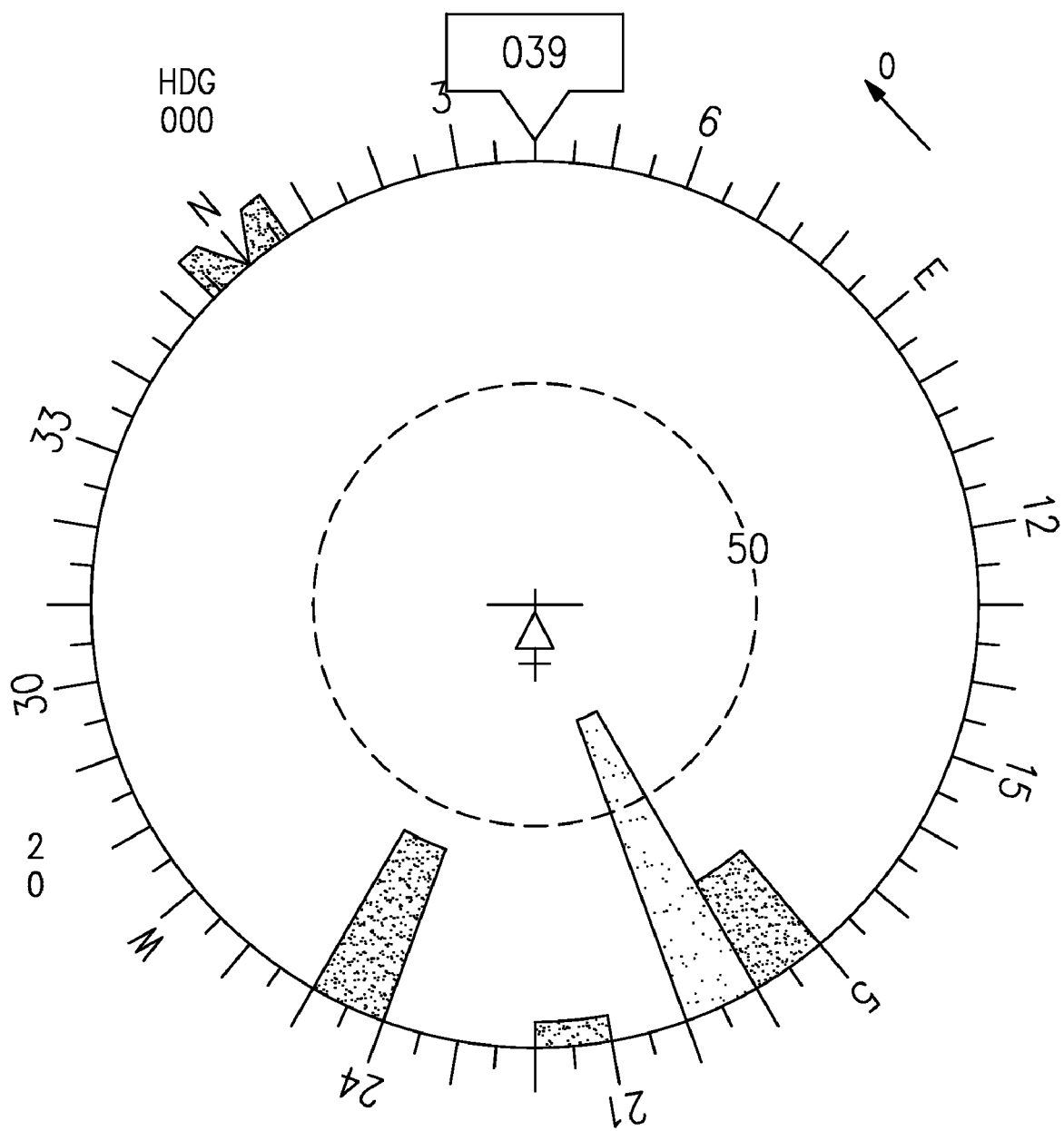
FIG. 2C is a representative a cockpit display of an avoidance system of the present invention.

The avoidance system 24 may alternatively or additionally be combined with an audible and/or visual warning through a cockpit display 46 such as a primary functional display (PFD; FIG. 2C) with or without the aforementioned limiting or "shaping" of the pilot control input.

Referring to FIG. 2C, the cockpit display 46 may illustrate obstacle proximity through several azimuthal 'fan beams' such that the pilot may instantly understand the relationship of the object to the aircraft. The display graphically illustrates obstacle range and azimuth information and color codes the applicable azimuthal sector to quickly convey "at a glance" to the pilot the relevant information on obstacles in proximity to the aircraft. The display is updated dynamically, and indicates Range and Time to impact. Is should be understood that this display figure is for example only, and any similar display and symbology in the art can be used.

Figure 3:
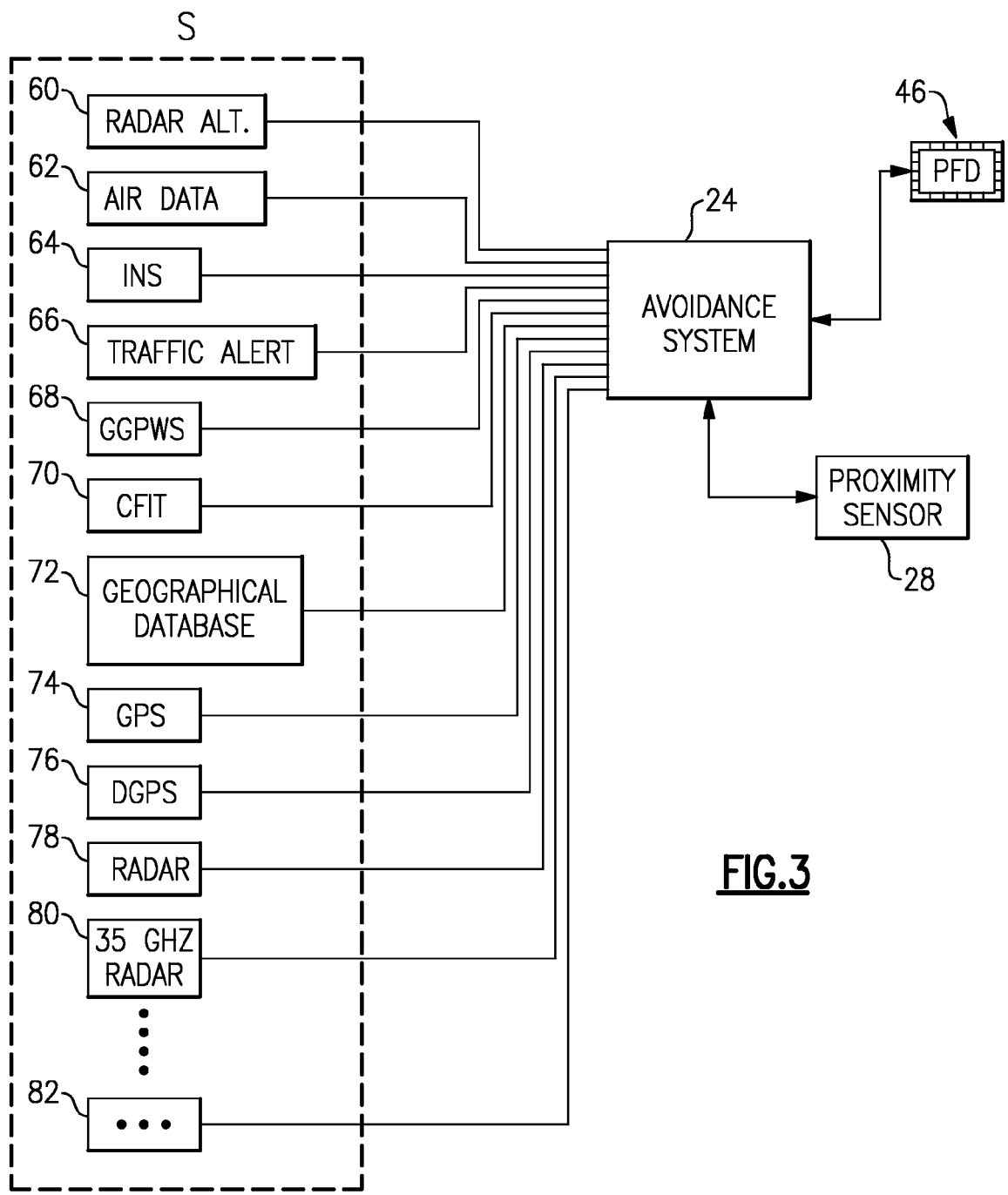
FIG. 3 is a block diagram of an avoidance system integrated with geographic positional sensor systems.
Figure 4:
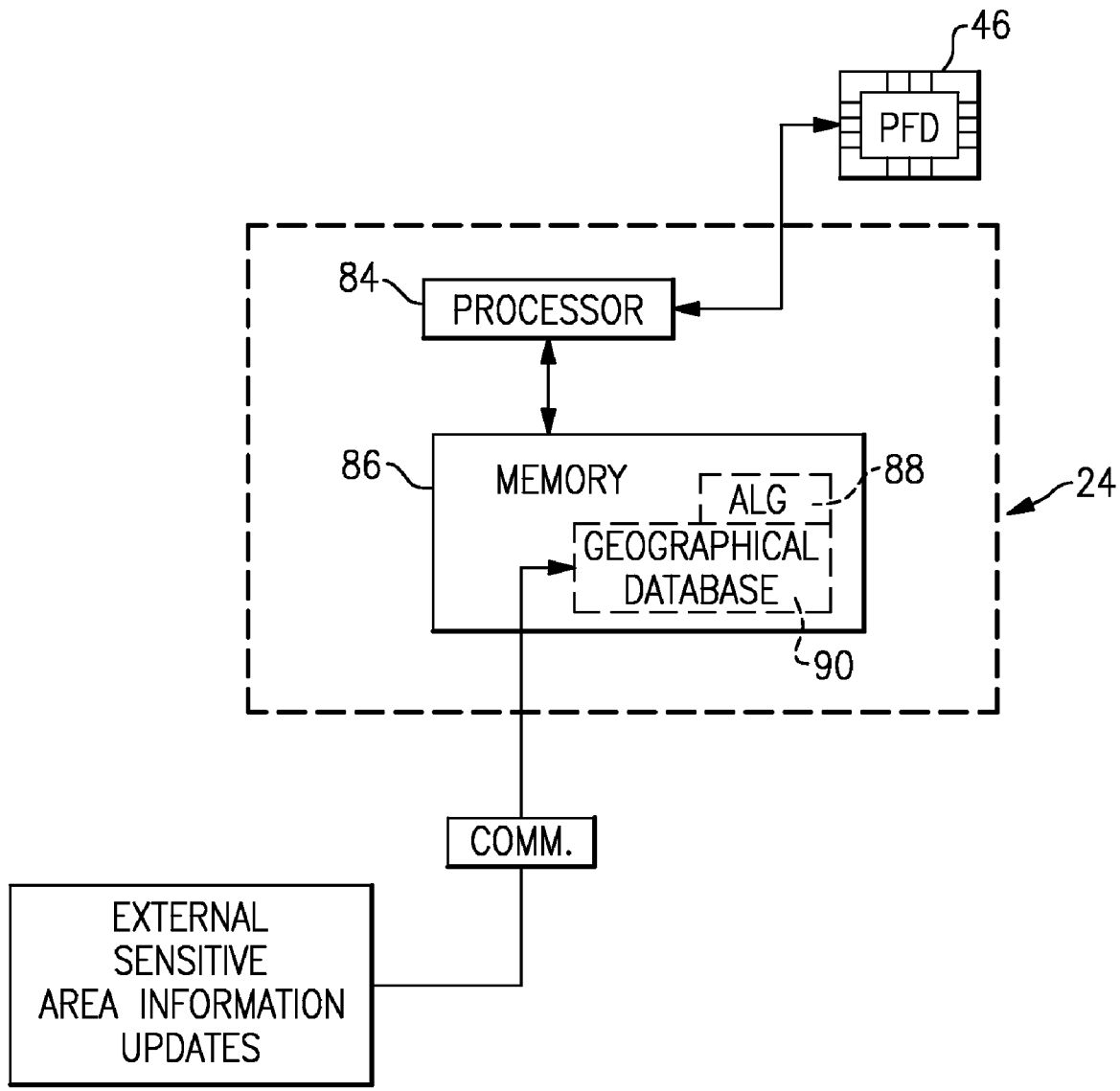
FIG. 4 is a block diagram of an avoidance system with a geographical database.

Referring to FIG. 3, the avoidance system 24 communicates with a multiple of geographical positional systems S to still further refine operation thereof. These systems S may include one of or any combination of, for example, a radar altimeter system 60, an air data system 62, an inertial navigation system 64, a traffic alert and collision avoidance system 66, an Enhanced Ground Proximity Warning System (EGPWS) 68 a Controlled Flight Into Terrain system (CFIT) 70, a geographical database 72 a global positioning system (GPS) 74, a Differential Global Positioning System (DGPS) 76, microwave radar 78, a 35 GHz wave scanning beam radar 80 as well as other systems 82. It should be understood that this list of systems is for example only, and the aircraft may utilize one, all, or any of these systems S as well as other systems Referring to FIG. 4, the avoidance system 24 typically includes a processing module 84, such as a microprocessor and a memory device 86 in communication therewith. The avoidance system 24 stores data and control algorithms in the memory device 86 or other suitable memory location. The memory device may, for example, include RAM, ROM, DVD, CD, a hard drive, or other electronic, optical, magnetic, or any other computer readable medium onto which is stored the data and control algorithms described herein. The control algorithms are the scheme by which the decisions are made.

The memory device 86 contains a geographic algorithm 88 and a sensitive area geographic database 90. The sensitive area geographical database 90 may alternatively or additionally receive information regarding "sensitive areas" from external sources as well as being pre-programmed therewith. Other operational software for the processing module may also be stored in memory device.

The geographic algorithm 88 of the avoidance system 24 utilizes a recursive algorithm to determine if the aircraft will enter an "avoid" zone should the aircraft continue on its present velocity vector. The geographic algorithm 88 preferably employs at least two levels of granularity when searching for avoid areas. To increase search efficiency, a coarse calculation of relative flat-earth distance determines if a sensitive area is being approached. Sensitive areas that fall within the coarse distance calculation are then subjected to a fine distance calculation. A multiple of such fine distance calculations may be performed simultaneously, while the coarse distance search continues in the background of the geographic algorithm 88. Since the geographic algorithm 88 preferably utilizes a multiple of the systems S (FIG. 3) loss of one system may be temporarily compensated for by another.

Figure 5B:
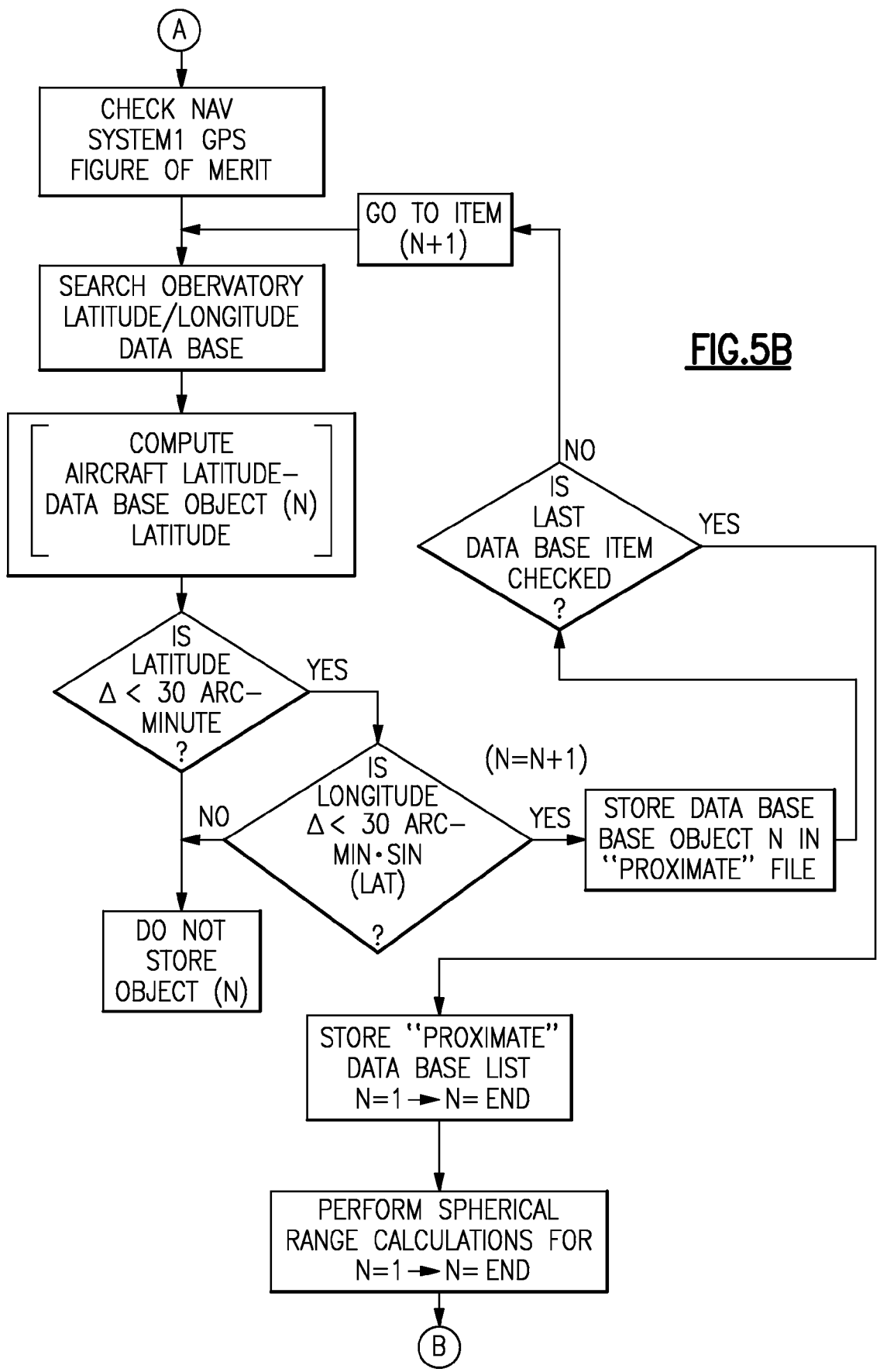
FIG. 5 is a flowchart of an avoidance algorithm utilizing at least two levels of granularity when searching for sensitive areas.
Figure 5C:
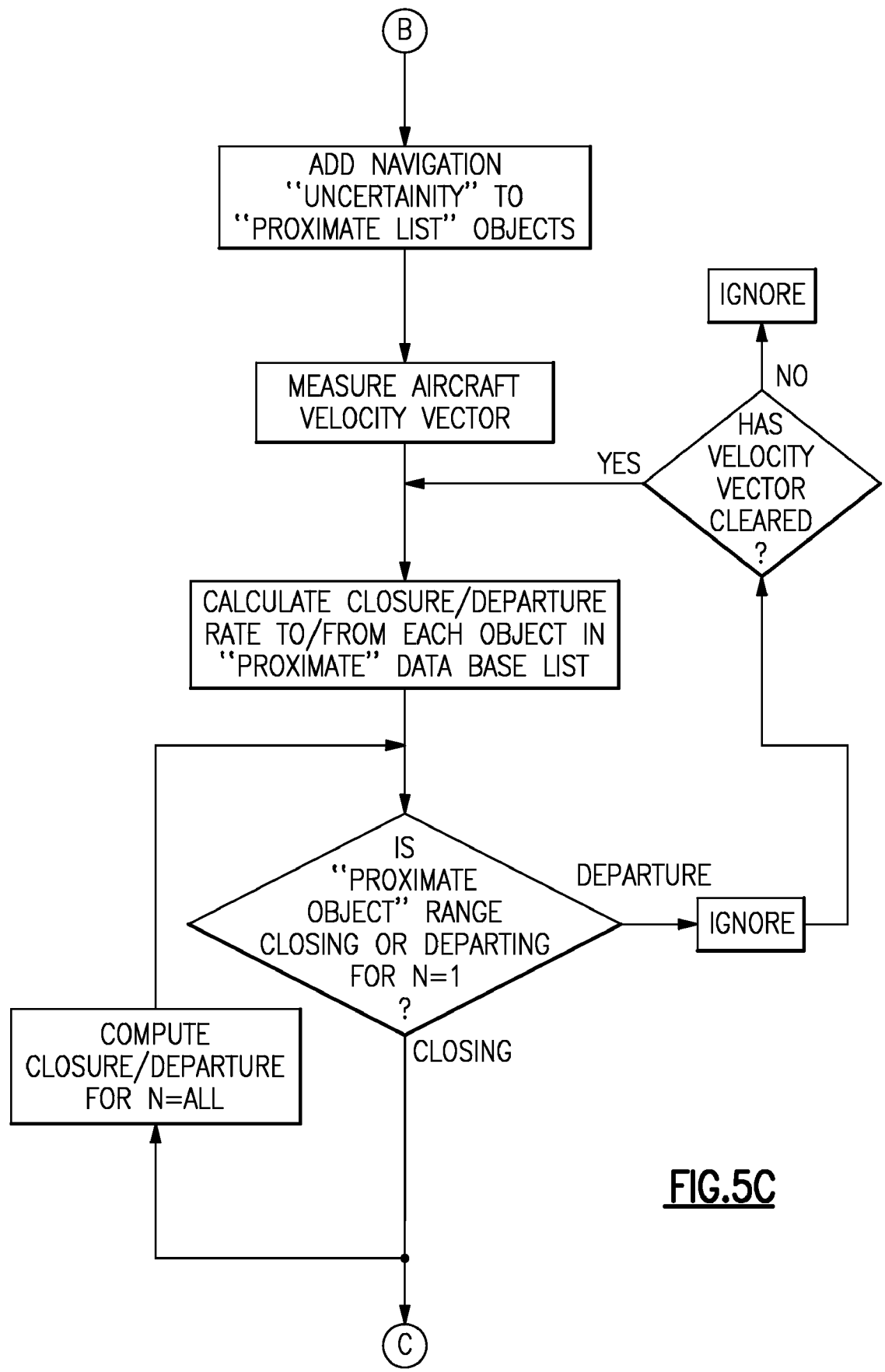
Figure 5D:
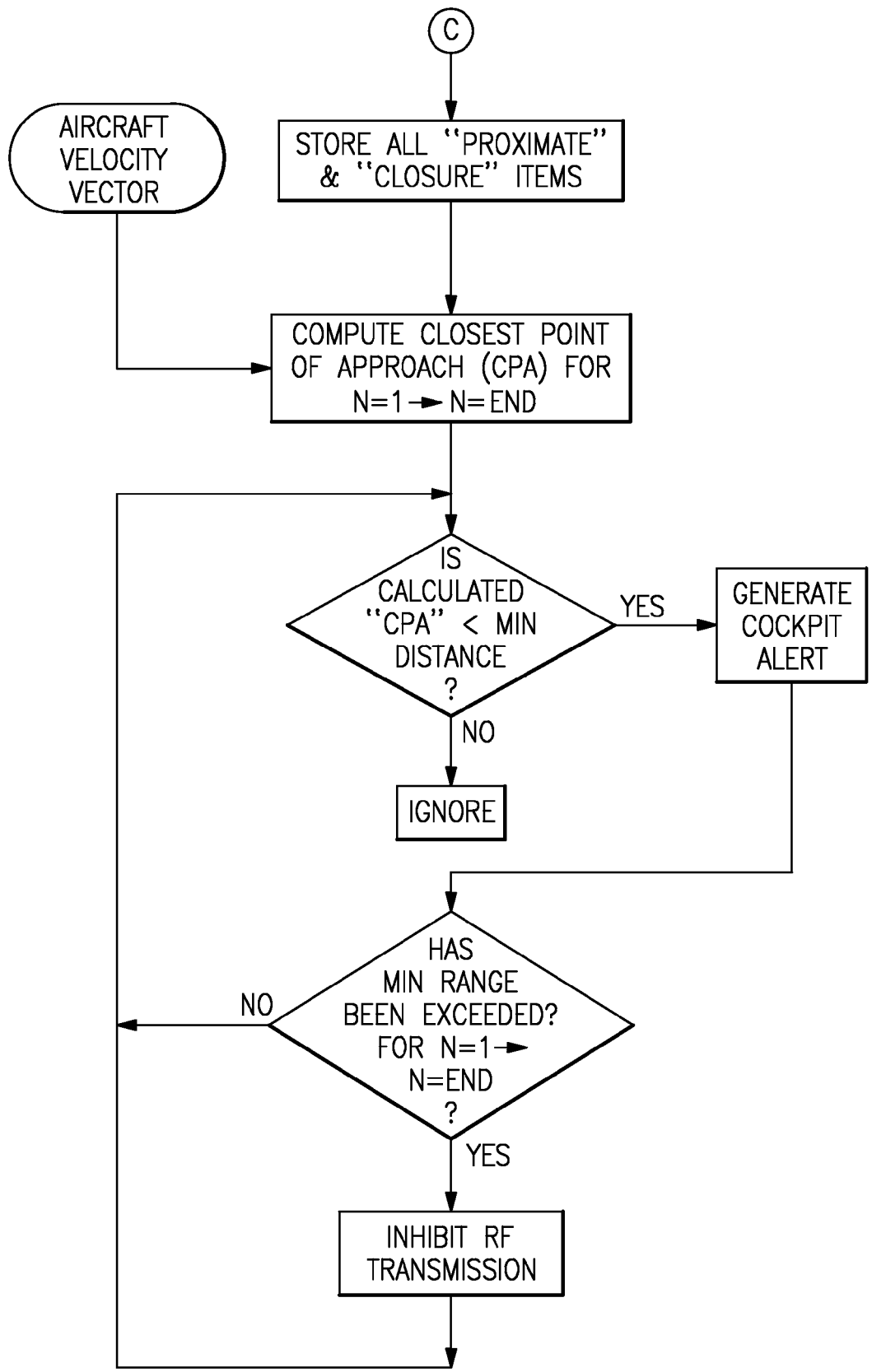
Figure 6:
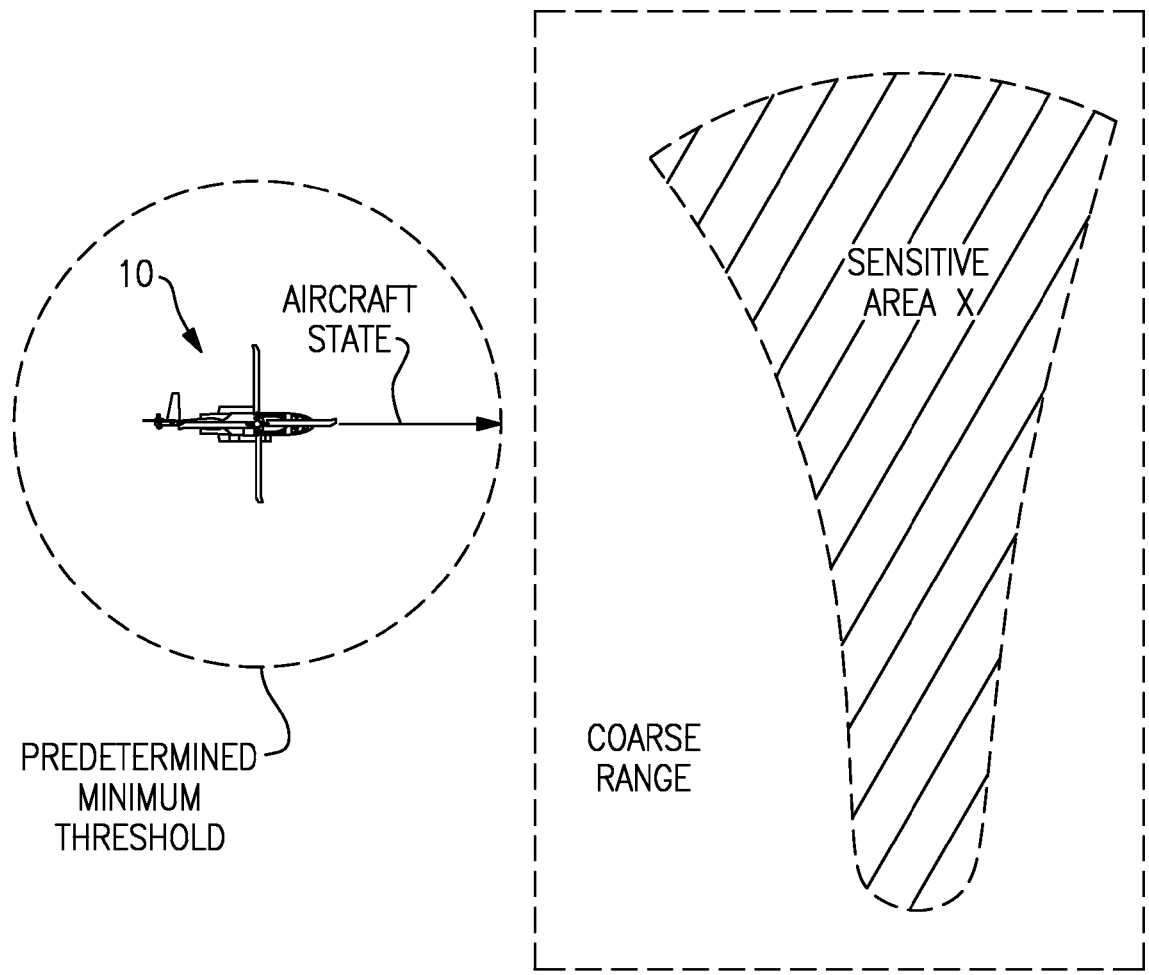
FIG. 6 is a schematic top view of an example aircraft traveling toward an example sensitive area.

In operation and with reference to FIG. 5, the geographic algorithm 88 initiates with a system health check whereby the systems S are evaluated for functionality. The system alerts the aircrew to the level of sensor failure. If the system is evaluated to be healthy or sufficiently healthy (partial system capability) to continue operation, then the geographic algorithm 88 initiates the recursive algorithmic search for sensitive areas.

With system health established, the geographic position of the aircraft is established and continually updated based on data from the systems S. The aircraft position is continually compared against the sensitive area geographic database 90 of known sensitive areas. Sensitive areas may include restricted airspace such as military installations, national monuments, NASA installations, as well as others. Furthermore, the sensitive area geographic database 90 may be time and date specific such that some areas may only be a "sensitive area" when particular events such as large sporting events or VIPs are so situated. Each category of sensitive areas is preferably maintained in a distinct file section of the sensitive area geographic database 90 such that each file has unique "avoid" parameters that may include: volume; altitude; elevation angles; time; date; type of facility, etc.

As the geographic algorithm 88 searches for sensitive areas which must be avoided, the aircraft state (position, velocity and altitude) is compared thereto. If and when the aircraft is determined to be within a coarse range of a sensitive areas stored within the sensitive area geographic database 90, then the avoidance system 24 will increase the analytical scrutiny of the relative distance and time to the sensitive area during the fine distance calculation. Although a particular geometric shape is illustrated in the disclosed embodiment representative of the coarse range, it should be understood that the coarse range may be of various sizes and shapes. Primary coarse range calculations of relative positions are preferably based on GPS sensed proximity.

Increased scrutiny during the fine distance step preferably includes the continual calculation of spherical range and closure rate for each sensitive area that is within the coarse range for the current aircraft state.

If the aircraft distance to a sensitive area decreases below a predefined minimum threshold, then an audible and/or visual warning is issued. Avoid parameters within the sensitive area geographic database 90 preferably display a suggested flight path to avoid the sensitive area on the PFD 46 to further guide the aircrew.

For certain sensitive areas, aircraft RF emissions from, for example, the proximity sensor suite 28 are silenced or reduced when the predetermined minimum threshold breaches the sensitive area. For some categories of sensitive areas the avoidance system 24 may reduce RF transmission in response to a change to the aircraft's flight path. Timing of the cockpit alert and RF silence is preferably determined as a function of aircraft state, e.g., the greater the aircraft velocity, the greater the required warning time. One specific type of sensitive area is an RF sensitive area typical of RF instruments such as radio telescope. The sensitive area geographic database 90 preferably includes a primary axes of the radio telescope, beam-width, azimuth and elevation capabilities.

Instruments such as radio-telescopes that are within the "Coarse Distance" zone are iteratively compared for Range/Azimuth/elevation and then compared against the parameters for the radio-telescope of interest. Those that are found to interfere in one or more of the radio-telescope's data base parameters are declared as pending or immediate conflict objects and the proximity sensor suite 28 is selectively shut-down. RF silence will be maintained until the aircraft distance to the RF sensitive area exceeds the minimum distance threshold.

Preferably, the PFD 46 displays a warning to the aircrew whenever the proximity sensor suite 28 is shut-down or is reduced in transmission power such that the aircrew is aware that the avoidance system 24 is inactive or operating at reduced power.

The avoidance system 24 potentially enables usage of relatively inexpensive UWB radar for the proximity sensor suite 28 rather than specific emitters in order to assure avoidance of interference with particular delicate instruments such as radio-telescopes and thereby meet regulations such as those propagated by the FCC.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A proximity warning system for an aircraft comprising:
    a proximity sensor suite mounted to the aircraft for detecting nearby obstacles;
    a database containing at least one sensitive geographic area;
    an aircraft positional system; and
    an avoidance system in communication with said database and said aircraft positional system, said avoidance system operable to determine an aircraft position relative said at least one sensitive geographic area and control a transmission power output of said proximity sensor suite in response to the aircraft position being within a predefined minimum threshold of said at least one sensitive area.

2. The system as recited in claim 1, further comprising an alert system which issues a warning in response to the aircraft position being within said predefined minimum threshold of said at least one sensitive geographic area.

3. The system as recited in claim 2, wherein said warning is an aural alert.

4. The system as recited in claim 2, wherein said warning is a visual alert.

5. The system as recited in claim 2, wherein said alert system includes a sensed proximity to a physical obstacle.

6. The system as recited in claim 2, wherein said alert system includes a "time to impact" threshold.

7. The system as recited in claim 2, wherein said alert system includes an approach toward an "Avoid area" defined by said at least one sensitive geographic area.

8. The system as recited in claim 7, wherein said warning is in response to intrusion into said "Avoid area."

9. The system as recited in claim 7, wherein said warning is in response to an RF beam.

10. The system as recited in claim 1, further comprising a display which illustrates proximity to said at least one sensitive area through at least one azimuthal fan beam.

11. The system of claim 10, wherein said fan beam is color coded in response to proximity.

12. The system as recited in claim 1, wherein said avoidance system employs at least two levels of granularity.

13. The system as recited in claim 12, wherein said avoidance system employs a coarse range flat-earth distance calculation to determine if said at least one sensitive area is being approached.

14. The system as recited in claim 13, wherein said avoidance system employs a fine range calculation that includes a continual calculation of a spherical range and a closure rate for said at least one sensitive area within said coarse range.

15. The system as recited in claim 1, wherein said database includes geographical coordinates for said at least one sensitive area.

16. The system as recited in claim 1, wherein said at least one sensitive area is defined by an RF instrument.

17. The system as recited in claim 16, wherein said RF instrument includes a radio telescope.

18. The system as recited in claim 17, wherein said at least one sensitive area includes primary axes, a beam-width, an azimuth and an elevation capability of said radio telescope.

19. The system as recited in claim 16, wherein said database includes time dependent information for said at least one sensitive area.

20. The system as recited in claim 1, wherein said at least one sensitive area is defined within said database as a point with an avoid radius parameter.

21. The system as recited in claim 1, wherein said at least one sensitive area is defined within said database as a point with a two dimensional avoid area parameter which extends therefrom, said avoidance system operable to determine said aircraft position in three-dimensions relative said at least one sensitive area.

22. An aircraft comprising:
    a proximity sensor suite mounted to the aircraft for detecting nearby obstacles;
    a database containing at least one sensitive geographic area;
    an aircraft positional system;
    an avoidance system in communication with said database, said aircraft positional system and said sensor suite, said avoidance system operable to determine an aircraft position relative said at least one sensitive geographic area to control a transmission power output of said proximity sensor suite in response to the aircraft position being within a predefined minimum threshold of said at least one geographic sensitive area; and
    an alert system in communication with said voidance system.

23. The aircraft as recited in claim 22, wherein said alert system issues a warning in response to said transmission power output of said proximity sensor suite being reduced.

24. The aircraft as recited in claim 22, wherein said at least one sensitive area is defined as a point with a two dimensional avoid area parameter, said two dimensional avoid area parameter defined by an RF beam.

25. The aircraft as recited in claim 22, wherein said proximity sensor suite includes a radar.

26. The aircraft as recited in claim 22, wherein said at least one sensitive area is defined by an RF instrument.

27. The aircraft as recited in claim 22, wherein said database includes time dependent information for said at least one sensitive geographic area.

28. The aircraft as recited in claim 22, wherein said proximity sensor suite generates a field of view about a tail rotor system of the aircraft.

29. A method of geographic area avoidance for an aircraft comprising the steps of:
   (A) storing at least one sensitive area within a database of an avoidance system;
   (B) determining an aircraft position relative to the at least one sensitive area and controlling a transmission power output of a sensor system in response to the aircraft position being within a predefined minimum threshold of said at least one sensitive area; and
   (C) displaying an alert in response to the aircraft position being within a predefined minimum threshold of the at least one sensitive area.

30. The method as recited in claim 29, wherein said step (A) further comprises the step of:
   (a) storing time dependent information related to the at least one sensitive area.

31. The method as recited in claim 29, wherein said step (A) further comprises the step of:
   (a) defining the at least one sensitive area by an RF instrument beam.

32. The method as recited in claim 29, wherein said step (C) further comprises the step of:
   (a) reducing a power of a sensor system.

33. The method as recited in claim 29, wherein said step (C) further comprises the step of:
   (a) silencing a sensor system.

34. The method as recited in claim 29, wherein said step (C) further comprises the step of:
   (a) displaying a suggested flight path relative the at least one sensitive area.

* * * * *